United States Patent [19]

Yoshikawa et al.

[11] Patent Number: 5,093,292
[45] Date of Patent: Mar. 3, 1992

[54] CHROMIUM OXIDE CATALYST IMPREGNATION REGENERATION METHOD

[75] Inventors: Yukihiro Yoshikawa, Chiba; Tooru Hihara, Fukuoka; Kunihiro Yamada, Fukuoka; Shinji Takenaka, Fukuoka; Kazunori Kawahara; Jun Kitagawa, both of Yamaguchi, all of Japan

[73] Assignee: Mitsui Toatsu Chemicals, Incorporated, Tokyo, Japan

[21] Appl. No.: 615,788

[22] Filed: Nov. 20, 1990

[30] Foreign Application Priority Data

Nov. 22, 1989 [JP] Japan .................. 1-301867

[51] Int. Cl.⁵ .................. B01J 23/92; B01J 21/20; C01B 7/04
[52] U.S. Cl. .................. 502/25; 423/502; 423/507; 502/26; 502/27
[58] Field of Search .................. 502/25-27, 502/20, 22; 423/502, 507

[56] References Cited

U.S. PATENT DOCUMENTS

| | | | |
|---|---|---|---|
| 2,415,152 | 2/1947 | Thomsen | 502/25 |
| 2,451,870 | 10/1948 | Richardson et al. | 423/502 |
| 2,678,259 | 5/1954 | Banner et al. | 423/502 |
| 3,342,557 | 9/1967 | Metalzeau | 502/20 |
| 3,989,807 | 11/1976 | Johnston | 423/502 |
| 4,774,070 | 9/1988 | Koff et al. | 423/502 |
| 4,803,065 | 2/1989 | Itoh et al. | 423/502 |
| 4,822,589 | 4/1989 | Kiyoura et al. | 423/507 |
| 4,828,815 | 5/1989 | Kiyoura et al. | 423/507 |

FOREIGN PATENT DOCUMENTS 0272332 6/1988 European Pat. Off. .
846832 8/1960 United Kingdom .
1312986 4/1973 United Kingdom .

*Primary Examiner*—Paul E. Konopka
*Attorney, Agent, or Firm*—Millen, White & Zelano

[57] ABSTRACT

The catalytic activity of a chromium oxide-based catalyst used in the production of chlorine by oxidation of hydrogen chloride gas with an oxygen-containing gas is regenerated by impregnating it with an aqueous solution of chromic acid anhydride or of a chromium salt and then calcining the catalyst at a temperature not higher than 800° C.

4 Claims, No Drawings

CHROMIUM OXIDE CATALYST IMPREGNATION REGENERATION METHOD

BACKGROUND OF THE INVENTION

1. Field of the Invention

The present invention relates to a method for regenerating a chromium oxide-based catalyst subsequent to its use in the production of chlorine by catalytic oxidation of hydrochloric acid.

2. Description of the Related Art

Chlorine is produced on a large scale by electrolysis of brine. The demand for chlorine has increased year by year. However, caustic soda is formed at the same time upon electrolysis of brine. Since the demand for caustic soda is lower than that for chlorine, difficulties are now increasingly recognized in the achievement of adequate balancing between the by-production of caustic soda from brine electrolysis and its consumption.

Hydrogen chloride is by-produced in a large quantity upon chlorination of organic compounds or upon reaction of organic compounds with phosgene. The by-produced quantity of hydrogen chloride is however much greater than its demand, so that a great deal of hydrogen chloride is disposed of as a waste product, yet costing substantial expenses for its disposal.

It is possible to meet the increasing demand for chlorine without developing an imbalance in demand with respect to caustic soda provided that chlorine can be efficiently reclaimed from hydrogen chloride.

Production of chlorine by oxidation of hydrogen chloride has been known under the name of the Deacon process for many years. Copper-base catalysts, the history of which goes back to the invention of Deacon in 1868 (British Patent No. 1403 granted in 1868), have conventionally been considered to exhibit the best activity. Numerous catalyst systems have been proposed to date, which contain one or more of various compounds as a third component in addition to copper chloride and potassium chloride. To oxidize hydrogen chloride at an industrially-acceptable reaction velocity by using these catalysts, it is however necessary to raise the reaction temperature to at least 450° C., thereby developing another problem that the service life of the catalysts is reduced due to flying-off of the catalyst components. In addition, the oxidation reaction of hydrogen chloride is a reversible reaction, and a lower temperature hence results in a higher concentration of chlorine at equilibrium. It is therefore essential to develop a catalyst which can exhibit its activity at a temperature as low as possible.

With the foregoing in view, catalyst systems other than copper-based catalyst systems have bee investigated.

It has been proposed to use a chromium oxide-based catalyst as an oxidation catalyst for hydrogen chloride because chromium oxide has better stability and durability to heat than copper-based catalysts.

For example, a process for the production of chlorine has been proposed in British Patent No. 584,790, whose disclosure is incorporated herein by reference in which hydrogen chloride is caused to flow at 400° C. over a chromium oxide catalyst prepared b impregnating a suitable carrier with chromic anhydride or with an aqueous solution of chromium nitrate and then thermally decomposing chromic acid anhydride or chromium nitrate. When the catalyst becomes deactivated, the feeding of hydrogen chloride is stopped and air is instead caused to flow to regenerate the catalyst. After the catalyst has been regenerated, the feeding of air is stopped and hydrogen chloride is again caused to flow.

A conversion of hydrogen chloride at a rate as high as 67.4% based on the theoretical value was reported in British Patent No. 676,667, whose disclosure is incorporated herein by reference, by reacting hydrogen chloride and an oxygen containing gas at a reaction temperature of 420°–430° C. and the space velocity of 380 $hr^{-1}$ while using a catalyst with chromium oxide of a dark blackish color or a dichromate supported on a carrier. In the above reaction, the conversion was 63% based on the theoretical value when the space velocity was 680 $hr^{-1}$. Although the reaction was found to proceed even at 340° C., the conversion was as low as 52% based on the theoretical value even when the space velocity was set at the low value of 65 $hr^{-1}$.

The above two processes both require a high reaction temperature and do not permit the use of a high space velocity, so that their practice in the industry is difficult.

It is reported in Japanese Patent Application Laid-Open No. 275104/1986 whose disclosure is incorporated herein by reference that a chromium oxide-based catalyst obtained by calcining at a temperature not higher than 800° C. a compound obtained by reacting ammonia with an aqueous solution of chromic acid, shows high activity in the oxidation reaction of hydrogen chloride. The use of this catalyst has made it possible to produce chlorine at a lower temperature and with a greater space time yield compared to the catalysts conventionally known.

A problem associated with the use of this catalyst is that when it is used in the oxidation reaction of hydrogen chloride gas, its activity is reduced within several months after the initiation of the reaction. As a reactivation method therefor, it has been proposed in Japanese Patent Application Laid-Open No. 254846/1987 to bring it into contact with hydrogen chloride gas and/or an oxygen-containing gas in a high-temperature vapor phase. However, when a catalyst reactivated by this method is employed in the oxidation reaction of hydrogen chloride gas, although the catalyst can exhibit activity as high as a fresh catalyst for several days after the initiation of the reaction, its activity is reduced after one week and the catalyst thus reactivated cannot therefore be used for a long period of time.

SUMMARY OF THE INVENTION

With the foregoing in view, the present invention has as a primary object the provision of a method useful for the regeneration of a spent chromium oxide catalyst whose activity has been reduced by its use in the production of chlorine by oxidation of hydrogen chloride.

In order to achieve the above object, the present inventors have proceeded with an extensive investigation to develop a method for the regeneration of a chromium oxide catalyst which has been employed in the production of chlorine by oxidation of hydrogen chloride.

As a result, it has been found that a catalyst with reduced activity can be activated and regenerated to extent suitable for long-term industrial use by impregnating the catalyst with an aqueous solution of a water soluble chromium compound, e.g., chromic acid anhydride or a chromium salt and then calcining the thus-impregnated catalyst at a temperature not higher than 800° C., leading to the completion of the present invention.

In one aspect of the present invention, there is thus provided a method for regenerating a chromium oxide catalyst, i.e., a catalyst in which chromium oxide is a principal component, with reduced activity as a result of its use in the production of chlorine by oxidation of hydrogen chloride gas with an oxygen-containing gas. The regeneration method comprises impregnating the used catalyst with an aqueous solution of a water soluble chromium compound and then calcining the thus-impregnated catalyst at a temperature not higher than 800° C.

In another aspect of the invention, hydrogen chloride is catalytically oxidized with an oxygen-containing gas employing a chromium oxide oxidation catalyst whose catalytic activity is maintained by periodically impregnating the catalyst with an aqueous solution of a chromium salt and then calcining the thus-impregnated catalyst at up to 800° C.

The catalyst thus regenerated by the method of this invention has high activity and can exhibit catalytic activity similar to fresh catalyst of the same type in a long-term life test.

DETAILED DESCRIPTION OF THE INVENTION

An example of a chromium oxide catalyst with reduced activity to which the method of this invention can be applied is one which has been employed in the oxidation of hydrogen chloride and which was prepared fresh by calcining at a temperature not higher than 800° C. a mixture of (a) a reaction product of a chromium salt such as chromium nitrate, chromium chloride or the chromium salt of an organic acid and ammonia or an ammonia-yielding compound such as urea, and (b) a silicon compound.

Although no particular limitation is imposed on the mixing ratio of chromium reaction product to silicon compound, they usually are employed in amounts which give a $Cr_2O_3/SiO_2$ (equivalent) weight ratio of from 30/70 to 95/5, said $Cr_2O_3$ and $SiO_2$ being their available forms after the calcination of the catalyst.

An example of hydrogen chloride which can be employed as a raw material in the oxidation reaction of hydrogen chloride is hydrogen chloride produced as a byproduct of a chlorination of an organic compound or of a reaction of an organic compound with phosgene.

An oxygen-containing gas is used as an oxidizing agent for the hydrogen chloride. Oxygen gas or air is often used. There is a tendency to use oxygen gas when a reactor of the fluidized bed type whereas air is employed when the reactor is of the fixed bed type.

Regarding the molar ratio of hydrogen chloride to the oxygen, an amount of oxygen-containing gas is employed in the reaction, which supplies at least about $\frac{1}{4}$ mole (equivalent) of oxygen per mole of hydrogen chloride. Usually, oxygen is used in a 5–200% excess of the chemical equivalent amount theoretically required.

It is suitable to feed hydrogen chloride at a rate of 200–1800 Nl/hr.kg-cat to the catalyst bed.

The reaction temperature generally ranges from 300° C. to 450° C., with 360°–420° C. being employed in many instances.

A chromium oxide catalyst used under the above reaction conditions for several months to half a year in the reaction has reduced activity, thereby providing a conversion of hydrogen chloride as low as 50–60%, compared to an initial conversion rate of 70–80%. Such catalysts typically have a $Cr_2O_3$ to $SiO_2$ molar ratio of about 0.17 or less. According to the present invention, it is possible to restore the activity of such a catalyst whose activity has been reduced by removing the catalyst from the stream of reaction gases, impregnating the catalyst with an aqueous solution of chromic acid anhydride ($Cr_2O_3$) or a chromium salt, preferably after being washed with water, and calcining the thus-impregnated catalyst at a temperature not higher than 800° C., and then returning the catalyst to the stream of reaction gases for reuse.

The temperature of water employed for optionally washing the catalyst generally ranges from 25° C. to 100° C., with 50°–80° C. being particularly preferred. Although no particular limitation is imposed on the amount of water to be employed for washing the catalyst, it is generally used in an amount 0.5–10 times by weight of the amount of the catalyst.

Examples of the chromium compounds which can be employed in the impregnation step include chromium acid anhydride and water-soluble chromium salts such as chromium nitrate and chromium chloride The concentration of the chromic acid anhydride or chromium salt in the aqueous solution can range widely, e.g., from 5% to 45%. Although the aqueous solution of the chromic acid anhydride or chromium salt can be impregnated to a predetermined level, i.e., which raises the $Cr_2O_3/SiO_2$ ratio after calcining to selected higher ratio in a single operation, it is preferable to impregnate the aqueous solution to the predetermined level in several operations. When the impregnation is conducted in several operations, the operation cycle of impregnation and subsequent pre-calcination drying, e.g., at 150°–300° C., is repeated several times, and the catalyst thus impregnated is finally calcined at a temperature not higher than 800° C.

When the impregnation is conducted to the predetermined level by a single operation, the impregnated catalyst is calcined directly at a temperature not higher than 800° C. No particular limitation is imposed on the amount of the chromic acid anhydride or chromium salt which is impregnated into the catalyst. Since chromium oxide partly evaporates when the catalyst is used in the oxidation reaction of hydrogen chloride, the chromic acid anhydride or chromium salt is generally impregnated to a level such that the chromium oxide thus evaporated can be replenished. Namely, the impregnation is conducted to regain a $Cr_2O_3/SiO_2$ weight ratio of from 30/70 to 95/5, said $Cr_2O_3$ and $SiO_2$ being the forms of Cr and Si available after the final calcination of the catalyst.

In the present invention, it is necessary to impregnate the catalyst, which is composed of chromium oxide as a principal component, with an aqueous solution of chromic acid anhydride or a chromium salt and then to calcine the thus-impregnated catalyst while maintaining the temperature below 800° C., preferably at 450°–650° C. Calcination at temperatures higher than 800° C. result in low catalytic activity. A calcination temperature below 450° C. may incompletely reactivate the catalyst.

The reactivation can be conducted batchwise or continuously, e.g., by replacing aliquots of the catalyst in a fluidized bed with corresponding amounts of reactivated catalyst. If this is done continuously or at frequent intervals, a steady state conversion rate near that achieved initially with the fresh catalyst can be obtained.

The method of the present invention will hereinafter be described more specifically by the following examples.

EXAMPLE 1

A tubular reactor having an internal diameter of 1 inch and made of stainless steel "SUS-316L" was packed with 50 g of a granular chromium oxide catalyst composed of 70 wt. % of chromia and 30 wt. % of silica and having a diameter of 5 mm and a length 6 mm. Waste hydrogen chloride gas and oxygen were caused to flow at 800 ml/min and 400 ml/min, respectively into the catalyst bed. The tubular reactor was externally heated to 370° C. in a fluidized sand bed, whereby the waste hydrogen chloride gas and oxygen were reacted.

The hydrogen chloride conversion rate was 74% on the 3rd day after the initiation of the reaction. The conversion rate had dropped to 70% on the 30th day after the initiation of the reaction and to 62% on the 65th day. At that point, the catalyst was removed from the reactor and then washed three times, each time with 30 ml of warm water of 60° C. on a Buchner funnel. The washed catalyst was then impregnated with 10 ml of a 40% aqueous solution of $Cr(NO_3)_3 \cdot 9H_2O$ and thereafter calcined at 250° C. for 3 hours.

The above impregnation with the aqueous solution of chromium nitrate and the subsequent calcination steps were repeated 4 times. The catalyst was then calcined at 520° C. for 5 hours so that the catalyst was regenerated. Using 50 g of the catalyst thus regenerated, the reaction was conducted as described above. The conversion was 79% on the 3rd day and 75% on the 10th day, 69% on the 30th day and 63% on the 65th day after the initiation of the reaction.

EXAMPLE 2

A glass-made fluidized-bed reactor having an internal diameter of 1 inch was packed with 40 g of a fine spherical fluidized-bed chromium oxide catalyst composed of 75 wt. % of chromia and 25 wt. % of silica and having an average particle size of 60 μm. Waste hydrogen chloride gas and oxygen were caused to flow at 334 ml/min and 167 ml/min, respectively into the catalyst bed. The reactor was externally heated in an electric furnace to raise the internal temperature thereof to 380° C., at which the waste hydrogen chloride gas and oxygen were reacted.

The conversion of hydrogen chloride was 72% on the 3rd day, 68% on the 30th day and 55% on the 65th day after the initiation of the reaction. At that point, the catalyst was removed from the reactor and then washed three times, each time with 30 ml of warm water (60° C.) on a Buchner funnel. The catalyst was then impregnated with 9 ml of a 40% aqueous solution of $Cr(NO_3)_3 \cdot 9H_2O$, and thereafter calcined at 200° C. for 3 hours. The above impregnation and calcination steps were repeated 3 times further. The catalyst was then calcined at 520° C. for 5 hours. Using 40 g of the catalyst thus regenerated, the reaction was conducted as described above. The conversion was 77% on the 3rd day, 73% on the 10th day, 67% on the 30th day and 55% on the 65th day after the initiation of the reaction.

EXAMPLE 3

A chromium oxide oxidation catalyst whose activity had been reduced to a 55% conversion rate, as a result of its use for 65 days in exactly the same manner as in Example 2, was washed three times, each time with 30 ml of warm water (60° C.) on a Buchner funnel. After the catalyst was impregnated with 30 ml of a 40% aqueous solution of $Cr(NO_3)_3 \cdot 9H_2O$, the catalyst was calcined at 520° C. for 5 hours. In exactly the same manner as in Example 1, 40 g of the catalyst thus regenerated were used for the oxidation reaction of hydrogen chloride. The conversion of hydrogen chloride was 73% on the 3rd day, 70% on the 10th day, 63% on the 30th day and 50% on the 65th day after the initiation of the reaction.

EXAMPLE 4

A 4-inch nickel-made fluidized-bed reactor was packed with 1 kg of a fine spherical catalyst composed of 70 wt. % of chromia and 30 wt. % of silica and having an average particle size of 62 μm. The reactor was externally heated to 400° C. in a fluidized sand bath. Waste hydrogen chloride gas and oxygen gas were caused to flow at 350 Nl/hr and 200 Nl/hr, respectively into the catalyst bed, whereby they were reacted.

The conversion of hydrogen chloride was 78% on the 3rd day, 76% on the 30th day and 63% on the 65th day after the initiation of the reaction. At that point, the catalyst was taken out of the reactor and then washed three times, each time with 700 ml of warm water (70° C.) on a Buchner funnel. The catalyst was then impregnated with 150 ml of a 40% aqueous solution of $Cr(NO_3)_3 \cdot 9H_2O$, and thereafter calcined at 230° C. for 3 hours. Similar impregnation and calcination were repeated 3 times further. The catalyst was then calcined at 520° C. for 5 hours. Using 1 kg of the catalyst thus regenerated, the reaction was conducted as described above. The conversion of hydrogen chloride was 80% on the 3rd day, 75% on the 30th day and 64% on the 65th day after the initiation of the reaction.

EXAMPLE 5

A catalyst the same as that employed in Example 2 was used for 65 days in a similar manner to Example 2. The used catalyst was washed with warm water, then impregnated with 9 ml of a 10% aqueous solution of $CrO_3$, and then calcined at 200° C. for 3 hours. The impregnation and the subsequent calcination were repeated three times, followed by calcination at 520° C. for 5 hours. Using 40 g of the catalyst thus regenerated, waste hydrogen chloride gas and oxygen were reacted as described above. The conversion of hydrogen chloride was 77% on the 3rd day, 73% on the 10th day and 68% on the 30th day after the initiation of the reaction and was still 54% on the 65th day.

COMPARATIVE EXAMPLE

The impregnation and calcination of used catalyst was conducted in the same manner as Example 1, except that the calcination temperature was increased from 520° C. to 900° C. Fifty grams of the catalyst thus regenerated were placed in a similar reactor. The conversion was 32% on the 3rd day, 30% on the 10th day, 28% on the 30th day and 25% on the 65th day after the initiation of the reaction.

We claim:

1. A method for regenerating a chromium oxide catalyst deactivated by its use in the production of chlorine by oxidation of hydrogen chloride gas with an oxygen-containing gas, which comprises the steps of (a) washing the deactivated catalyst with water; (b) impregnating the washed catalyst with an aqueous solution of chromic acid anhydride or a chromium salt; (c) calcining the thus-impregnated catalyst at a temperature not higher than 800° C.; and (d) repeating the impregnating and calcining steps at least once.

2. The method according to claim 1, wherein the calcining step is conducted at 450°-650° C.

3. The method according to claim 1, wherein the catalyst is impregnated with chromium nitrate.

4. The method according to claim 1, wherein the calcining step is conducted at 450°-650° C. and wherein the catalyst is impregnated with chromium nitrate.

* * * * *